(12) United States Patent
Bays et al.

(10) Patent No.: US 8,327,260 B2
(45) Date of Patent: Dec. 4, 2012

(54) SYSTEM FOR ANNOTATING A DATA OBJECT BY CREATING AN INTERFACE BASED ON A SELECTED ANNOTATION STRUCTURE

(75) Inventors: Alan Ronald Bays, Cochrane (CA); Laura Myers Haas, San Jose, CA (US); Hans Werner Horn, San Jose, CA (US); Julia Elizabeth Rice, San Jose, CA (US); Peter Martin Schwarz, San Jose, CA (US); William Clarence Swope, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 1164 days.

(21) Appl. No.: 11/325,371

(22) Filed: Jan. 3, 2006

(65) Prior Publication Data

US 2006/0129596 A1 Jun. 15, 2006

Related U.S. Application Data

(62) Division of application No. 10/243,404, filed on Sep. 12, 2002, now Pat. No. 7,013,307, which is a division of application No. 09/429,550, filed on Oct. 28, 1999, now Pat. No. 6,519,603.

(51) Int. Cl.
*G06F 17/00* (2006.01)

(52) U.S. Cl. ........ 715/230; 707/707; 707/708; 707/767; 707/771

(58) Field of Classification Search .................. 715/230, 715/231, 232, 233; 707/102, 999.102, E17.143, 707/999.104

See application file for complete search history.

(56) References Cited

U.S. PATENT DOCUMENTS

| | | | |
|---|---|---|---|
| 5,309,359 A * | 5/1994 | Katz et al. | 1/1 |
| 5,404,295 A * | 4/1995 | Katz et al. | 715/231 |
| 5,548,739 A | 8/1996 | Yung | |
| 5,600,775 A | 2/1997 | King et al. | |
| 5,666,528 A * | 9/1997 | Thai | 707/102 |
| 5,675,753 A * | 10/1997 | Hansen et al. | 715/744 |
| 5,812,134 A * | 9/1998 | Pooser et al. | 715/848 |
| 5,832,474 A | 11/1998 | Lopresti et al. | |
| 5,930,746 A | 7/1999 | Ting | |
| 6,085,185 A * | 7/2000 | Matsuzawa et al. | 707/2 |
| 6,249,784 B1 | 6/2001 | Macke et al. | |
| 6,279,014 B1 * | 8/2001 | Schilit et al. | 715/234 |

(Continued)

OTHER PUBLICATIONS

Advanced Indexing and Retrieval in Present-day Content Management Systems Thomas Kunkelmann, tecmath AG, 67657 Kaiserslautern, Germany Roberto Brunelli, ITC-irst, 38050 Trento, Italy 2002 IEEE.*

(Continued)

*Primary Examiner* — Stephen Hong
*Assistant Examiner* — Ahamed I Nazar
(74) *Attorney, Agent, or Firm* — Cantor Colburn LLP

(57) ABSTRACT

A method and apparatus for capturing annotations about database material in a way that allows queries with conditions or predicates on both the database material and the annotations. Database material may be text, computer programs, graphics, audio, spreadsheets, or any other material which may be stored and indexed. Database material may be in one or multiple sources, and annotations may be stored together with the original material or in a separate store. Annotations can be used to capture information such as additional facts about the database material, the opinions and judgments of experts about the database material, and/or links to other related material. Annotations may be captured in a structured form to enhance queryability and semantic interpretation.

11 Claims, 12 Drawing Sheets

U.S. PATENT DOCUMENTS

| | | | |
|---|---|---|---|
| 6,311,189 B1 * | 10/2001 | deVries et al. | 1/1 |
| 6,332,144 B1 | 12/2001 | deVries et al. | |
| 6,618,732 B1 | 9/2003 | White et al. | |
| 6,618,733 B1 | 9/2003 | White et al. | |
| 6,671,692 B1 * | 12/2003 | Marpe et al. | 707/102 |
| 6,938,203 B1 * | 8/2005 | Dimarco et al. | 715/209 |
| 6,993,517 B2 * | 1/2006 | Naito et al. | 707/3 |
| 7,188,306 B1 * | 3/2007 | Chang et al. | 715/205 |
| 7,234,104 B2 * | 6/2007 | Chang et al. | 715/202 |
| 7,337,389 B1 * | 2/2008 | Woolf et al. | 715/230 |
| 7,421,448 B2 * | 9/2008 | Spork | 707/102 |
| 7,424,670 B2 * | 9/2008 | Burke et al. | 715/230 |
| 7,502,809 B2 * | 3/2009 | Albornoz et al. | 707/102 |
| 2005/0081159 A1 * | 4/2005 | Gupta et al. | 715/751 |
| 2006/0059419 A1 * | 3/2006 | Santicola | 715/512 |
| 2006/0218478 A1 * | 9/2006 | Nonclercq et al. | 715/500 |
| 2007/0118554 A1 * | 5/2007 | Chang et al. | 707/102 |
| 2008/0256114 A1 * | 10/2008 | Rasmussen et al. | 707/102 |

OTHER PUBLICATIONS

On Web Annotations: Promises and Pitfalls of Current Web Infrastructure, by Vasudevan et al., Proceedings of the 32nd Hawaii International Conference on System Sciences—1999, pp. 1-9.*

Using Meta-Data to Support Customization, by Hicks et al., Department of Computer Scienc—Aalborg University Esbjerg, Niels Bohrs Vej 8, 6700 Esbjerg—Denmark, Apr. 21, 1999.*

Shared Annotation for Cooperative Learning, Davis et al., Computer Science Department, Cornel University, Ithaca, NY 14853, 1995, pp. 84-88.*

Davis et al. (Shared Annotation for Cooperative Learning, Computer Science Department, Cornel University, Ithaca, NY 14853, CSCL 1995 Proceedings, pp. 84-88.*

Hicks et al. (Using Meta-Data to Support Customization, Department of Computer Science, Aalborg University Esbjerg, Niels Bohrs Vej 8, 6700 Esbjerg, pp. 1-8.*

DiMarco et al. The Automated generation of Web documents that are tailored to the individual reader, University of Waterloo, Waterloo, Ontario, Canada, pp. 1-10.*

Environmental Digital Library Systems, by Hicks et al., Published in Proceedings of the 1. GI-Workshops "Hypermedia und Umweltschutz", Metropolis Verlag, 1998, pp. 1-15.*

Shared Annotation for Cooperative Learning, by Davis et al., Xerox Corporation, Design Research Institute, Computer Science Department, Cornel University, published 1995, pp. 84-88.*

Using Meta-Data to Support Customization, by Hicks et al., Department of Computer Science—Aalborg University Esbjerg Niels Bohrs Vej 8, 6700 Esbjerg—Denmark, published Apr. 21, 1999, pp. 1-8.*

Chapter 1, overview, printed on Oct. 21, 1999, from web page http://www.ncgr.org/research/sequence/schema.html.

* cited by examiner

SYSTEM FOR ANNOTATING A DATA OBJECT BY CREATING AN INTERFACE BASED ON A SELECTED ANNOTATION STRUCTURE

PRIORITY CLAIM

The present application is a divisional of U.S. patent application Ser. No. 10/243,404, filed on Sep. 12, 2002, now U.S. Pat. No. 7,013,307, which, in turn, is a divisional of Ser. No. 09/429,550, filed on Oct. 28, 1999, issued as U.S. Pat. No. 6,519,603 on Feb. 11, 2003, all of which are assigned to the same assignee as the present application and are incorporated herein by reference.

FIELD OF THE INVENTION

The present invention relates to the field of data entry and retrieval. Specifically, the present invention relates to a method and system having the capability to organize an annotation structure and to query both data and annotations in computer systems. More particularly, the present invention enables the annotation of stored information, and permits the capture, sharing, and querying of data and annotations.

BACKGROUND OF THE INVENTION

Successful planning and decision making in many technical and other industries depends on the expeditious and correct interpretation of complex information. For example, in the drug industry the data may have origins as diverse as high throughput screening experiments, clinical trials, patent information and research journals. In the petroleum industry the data may span seismic measurements, aerial surveys, laboratory data and economic forecasts. A system capable of providing unified access to disparate data sources and applications reduces the time spent finding, accessing, preparing, transforming and reformatting data, and allows professionals to focus on the interpretation and extraction of knowledge for planning and decision making.

However, one complication with providing this type of unified access is that the data inevitably spans several disciplines, with an attendant probability of misinterpretation. Extensive knowledge of multiple domains is required if misuse is to be avoided.

Therefore, there is still an unsatisfied need for an information management system that clarifies the generation, use, and purpose of the data. The information management system can capture knowledge about the genesis and history of the data, how analyses are done, how decisions are made, and what the outcomes are. This "corporate memory" forms the basis for the analysis required to make better technical and business decisions.

Several attempts have been made to access information based on annotations. Illustrative attempts are described in the following references:
U.S. Pat. No. 5,404,295 to Katz et al.
U.S. Pat. No. 5,600,775 to King et al.
U.S. Pat. No. 5,832,474 to Lopresti et al.
U.S. Pat. No. 5,548,739 to Yung.

For example, U.S. Pat. No. 5,404,295 describes a method and apparatus for computer retrieval of database material. Annotations are provided for selected database subdivisions and are converted to a structured form and stored in that form along with connections to corresponding subdivisions. Searching for relevant subdivisions involves entering a query in natural language or structured form, converting natural language queries to structured form, matching the structured form query against stored annotations, and retrieving database subdivisions connected to matched annotations.

However, the teaching of this patent is limited to a system with the capability to search the annotations to locate the database material. The system does not have the capability to search the stored information based on both the annotations and database material, or to search on database material to retrieve the annotations. As a result, the system is not suitable for directly locating a subset of data where the filter has predicates on both the annotations and database material. Rather, it will locate all database material that corresponds to the annotation predicates and it would require a second step to filter this subdivision and to apply the data predicates.

SUMMARY OF THE INVENTION

The present invention contemplates a method and apparatus for capturing annotations about database material in a way that allows queries with conditions or predicates on both the database material and the annotations. Database material may be text, graphics, spreadsheets, relational tables or any other material which may be stored and indexed. An annotatable data item (i.e. the subsection of database material that can be annotated) is any entity referenced by an index (e.g. by an object identifier) or any attribute or subcomponent of such an entity, or any arbitrary set of such items. Examples include a table such as a relational table or spreadsheet, a view such as a relational view, a row within a table, a cell within a table (i.e. the intersection of a column and a row), a column within a table, an object, an attribute of an object, a set of rows or columns from one table, or a set of rows from different tables. The annotatable data items may be in a single source or multiple sources, or span such sources. Multiple annotations may be entered for a single annotatable data item.

The annotations, together with the pointer information that relates them to the original database material, may be stored in a separate source so that the data model and operation of the sources containing the original database material is not affected. It is the pointer information that allows formulation of the queries to retrieve either annotations related to specific database material or database material related to specific annotations.

Annotations may be used to capture information such as additional facts about the database material, the opinions and judgments of experts about the database material, and/or links to other related material. Annotations may be entered manually or automatically by an application. Henceforth, the person or application that enters an annotation will be referred to as an annotation author, and the person or application that retrieves annotation and/or database material will be referred to as the reader.

Annotations may be captured in structured form to enhance queryability and semantic interpretation as well as to provide some order for users to enter this additional information content. The entry of comments in an unorganized and undisciplined way can often lead to more data with little useful content. The structure is comprised of labeled categories, to aid semantic interpretation. The annotation structure could be as simple as a "header" category containing attributes (or fields) about whom and when the person or application wrote the annotation, together with a "business meaning" category containing a single "Comment" field for a textual description of the data item being annotated. In this example, the title of the latter category, "business meaning" can aid in the interpretation of the "Comment" field. An annotation structure may be more complicated than the one illustrated above and contain many categories, each of which contains a number of attributes. Some or all of these attributes may have constraints placed on their values. For example, the constraints may be on the datatype (e.g. numeric, character) and/or on their values, so that users have to enter values consistent with a particular datatype or consistent with an input list or pick-list. The constraints enforce more structure and consistency in the annotation content and also enhance the queryability with today's query engines.

It is the capture and query of information from experts represents one important feature of the present invention. To this end, the present method offers the capability to allow standardized structure of annotations based on the "group" to which the author and reader belong, as well as on the data item being annotated. A group can be as small as one person, in which case there can be a personalized annotation structure, or it can contain a "related" set of people, such as people of a particular discipline or performing a particular role. Henceforth, group will be referred to as a "context". There is a context associated with the annotation author as well as the reader. Thus, it is permitted for the structure for the entry of an annotation about any one data item to be different depending on the context of the author, and for this information to be presented differently on retrieval depending on the context of the reader. These structures that are associated with contexts, can be used to give a level of credibility to the annotations. That is, the annotation structure may be set up such that only experts in a given discipline (context) can enter information or advice pertaining to the expertise understood by that discipline. Filtering and transforming the entered annotation content based on the context of the reader can be used to retrieve only relevant information, or to "hide" information to which this reader context is unauthorized, or to present the information in a form easily understood by the discipline or role of the reader. Multiple annotations from authors with different contexts or within the same context can be attached to a single annotatable data item.

It should be understood that the foregoing capabilities encompass a single annotation structure containing an attribute such as "Comment" or "URL" for every annotatable data item, wherein annotations of this type are entered and retrieved in the same way by all author/readers.

The method of the present invention is outlined as follows: The type of annotatable data item is identified and the allowed structures for this type are registered. A type may include, but is not limited to, "set of rows of table x" or "any cell in column y of spreadsheet z". This registration step can be done as a pre-processing step or may be done immediately before annotation entry.

For annotation entry, an annotatable data item is chosen (e.g. a 5th cell in column y of spreadsheet z) and an annotation is entered and stored. The annotation is associated with the annotatable data item at the time of entry by including pointer information to the annotatable data item with the annotation. Optionally, the annotation may be "propagated" or automatically associated with additional annotatable data items using extra information defined in the registration step. Once annotations have been stored, queries may be issued to retrieve both the annotation content and/or the database material.

There are a number of query modes possible. In the first mode, the reader may browse the annotations in the context of the database material. That is, the reader identifies the specific database material of interest and all accompanying annotations are retrieved. This is achieved by issuing a query using the pointer information stored with the annotations. This mode is useful when the reader is perusing database material and wants to read annotations that contain related information or links to related information.

A second mode refers to querying for particular annotations in the context of the data. That is, the reader first identifies the database material of interest. This may include identifying an annotatable data item or a type of annotatable data item. In the case of an annotatable data item, the reader asks for the accompanying annotations with particular characteristics, (e.g. where the author field contains Smith). In the case of a type, the reader may ask for elements of the type whose annotations have particular characteristics. A query is issued that uses the pointer information and specifies a filter on the annotation content.

The reader may alternatively ask for only the elements of the type and their annotations where the elements of the type and their annotations both have filters on their content. In this case, a query is issued that uses the pointer information and specifies a filter on the annotation content and also a filter on the data content.

The second mode is useful when the reader wishes to review only certain annotations that relate to the data (e.g. all those by expert X) or when the reader wishes to focus on particular database material and annotation content (e.g. find all the data and annotations about drug molecules that have biological activity greater than x (data content) and for which the experts said the experimental measurement was reliable (annotation content)).

The third mode involves querying across the full body of annotations, regardless of the database material being annotated. This may be used, for example, for locating all annotations containing a particular category or for locating annotations containing particular content. For example, an exemplary query can be: How many times has Simulation package x been used to generate production estimates?

The fourth mode involves querying for particular data in the context of the annotations, is an extension of the third mode. In this case, the query retrieves not only the annotations of interest but also the database material that they annotate. For example, in the fourth mode, the answer to the above exemplary query: "How many times has Simulation package x been used to generate production estimates?" might include not only how many times the package x has been used but also the values of the production estimates. This mode also uses the pointer information in order to formulate the query to retrieve the appropriate database material.

According to a preferred embodiment, an information management method is implemented by the information management system, whereby one or more users such as administrators, annotation authors, readers, and/or applications, start the information management method of the present invention by setting up an annotation structure. Using the information management system, a user is capable of performing any one or more of the following tasks or processes:

Enter annotations about the data or fields by various input means.

Browse annotations in the context of data.

Simultaneously query for both annotations and data.

Query for particular annotations in the context of data.

Query across the full body of annotations.

Query for particular data in the context of the annotations.

It is therefore clear that the information management system is not domain specific, in that it can be used in combination with any application regardless of the complexities of the underlying technical or professional fields. The data model for the annotations (i.e., the annotation metadata model) is generic, self-describing, and self-contained.

The information management system is adaptable to the user's query preferences in that the information management system provides the ability to operate in a data-centric mode or in an annotation-centric mode. The data centric-mode will be explained in connection with FIGS. 5 and 6, and allows the user to select desired data items and to subsequently query and retrieve data and annotations based on these data items. The annotation-centric mode will be explained in connection with FIGS. 7 and 8, and allows the user to select the annotation categories and to subsequently query and retrieve data and annotations based on the content of the selected annotation categories. As a result, the information management system allows both data and annotations to be queried, in that queries can be made over the data content, over the annotation content, or over both simultaneously. This provides the ability to query the annotations, or the annotations and the data, and further provides the ability to retrieve the annotations when their associated data is retrieved.

Yet another feature of the information management system is its ability to allow annotations to be targeted to, or associated with data at different levels of granularities, such as: collection/view/table, attribute/column, instance/row, cell, arbitrary combinations thereof, and so forth.

Still another feature of the information management system is its ability to support storage and retrieval of annotations with a generic structure or a more specific structure, where the structure can depend on the nature of the data being annotated and the context of the author of the annotation.

In addition, the information management system is capable of supporting annotations of data in a variety of sources, formats, and/or data models. The information management system can annotate data in multiple sources when coupled with a data integration engine, in only one source, or in any source regardless of the source's data model (diverse sources). Further, the information management system can annotate views on the data in these sources, without requiring the data sources being annotated to be modified. The information management system can have multiple annotations for the same data object, and different annotations on the same data item can be entered by different people/applications or by the same person/application at different times. Moreover, when the annotations are retrieved, they can be filtered or modified in a way that depends on the context of the reader. The annotations can also be propagated to specific target data items that can be selected from a drop down list, or by entering a free format text, numeric, document, URL, and so forth.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items.

DETAILED DESCRIPTION OF PREFERRED EMBODIMENTS

Figure 1:
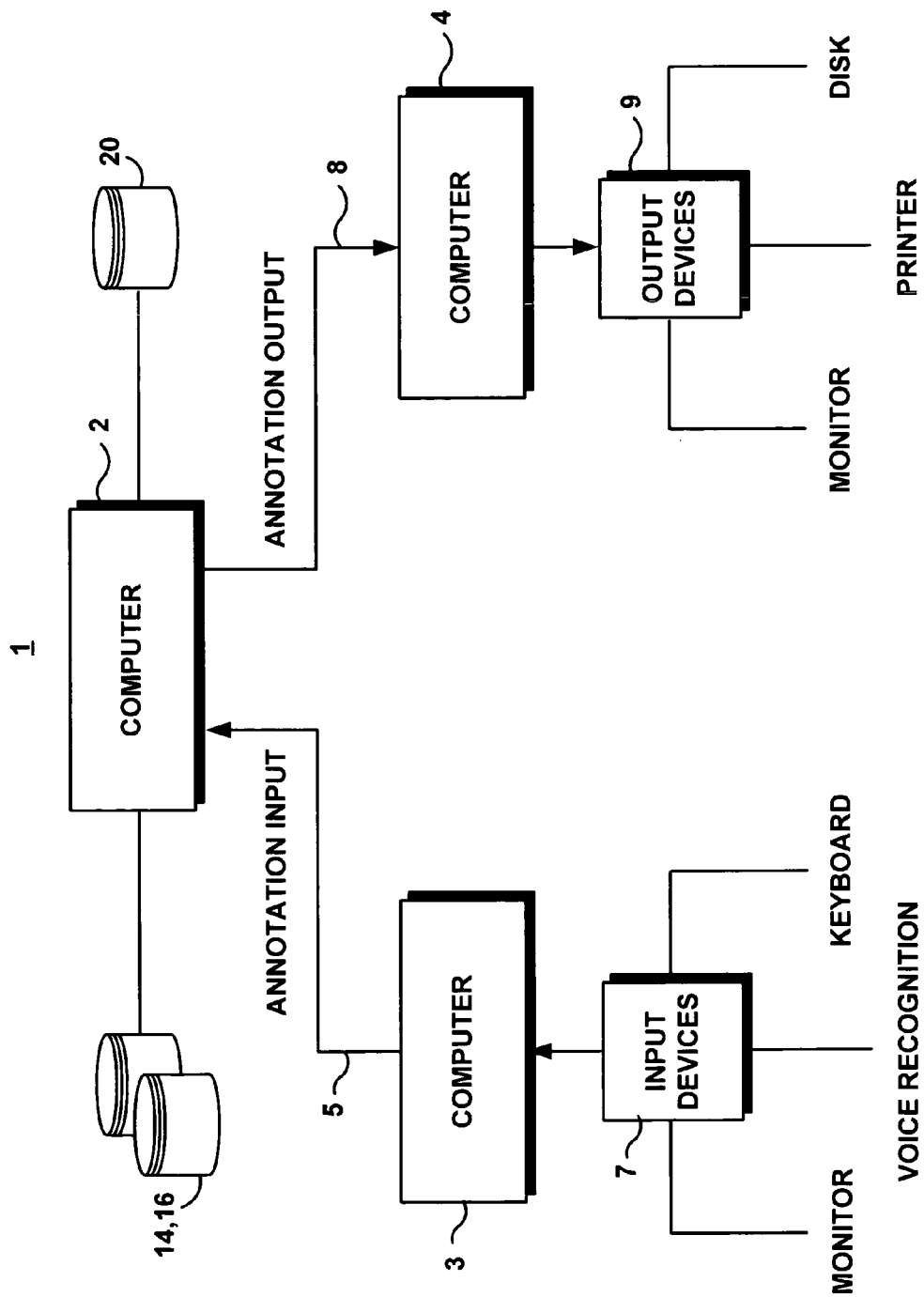
FIG. 1 is a high level architecture of an information management system according to the present invention.

FIG. 1 illustrates a system 1 that might be utilized to practice the teachings of the present invention. The system 1 includes a plurality of computers or processors 2, 3, 4. While for purposes of illustration the computers 2, 3, 4 are described as possessing specialized functions, it should be clear that any one, or a combination of the computers 2, 3, 4 can be used to generate the annotations, and to search the data and annotations sources (e.g. databases) as described herein.

Figure 1A:
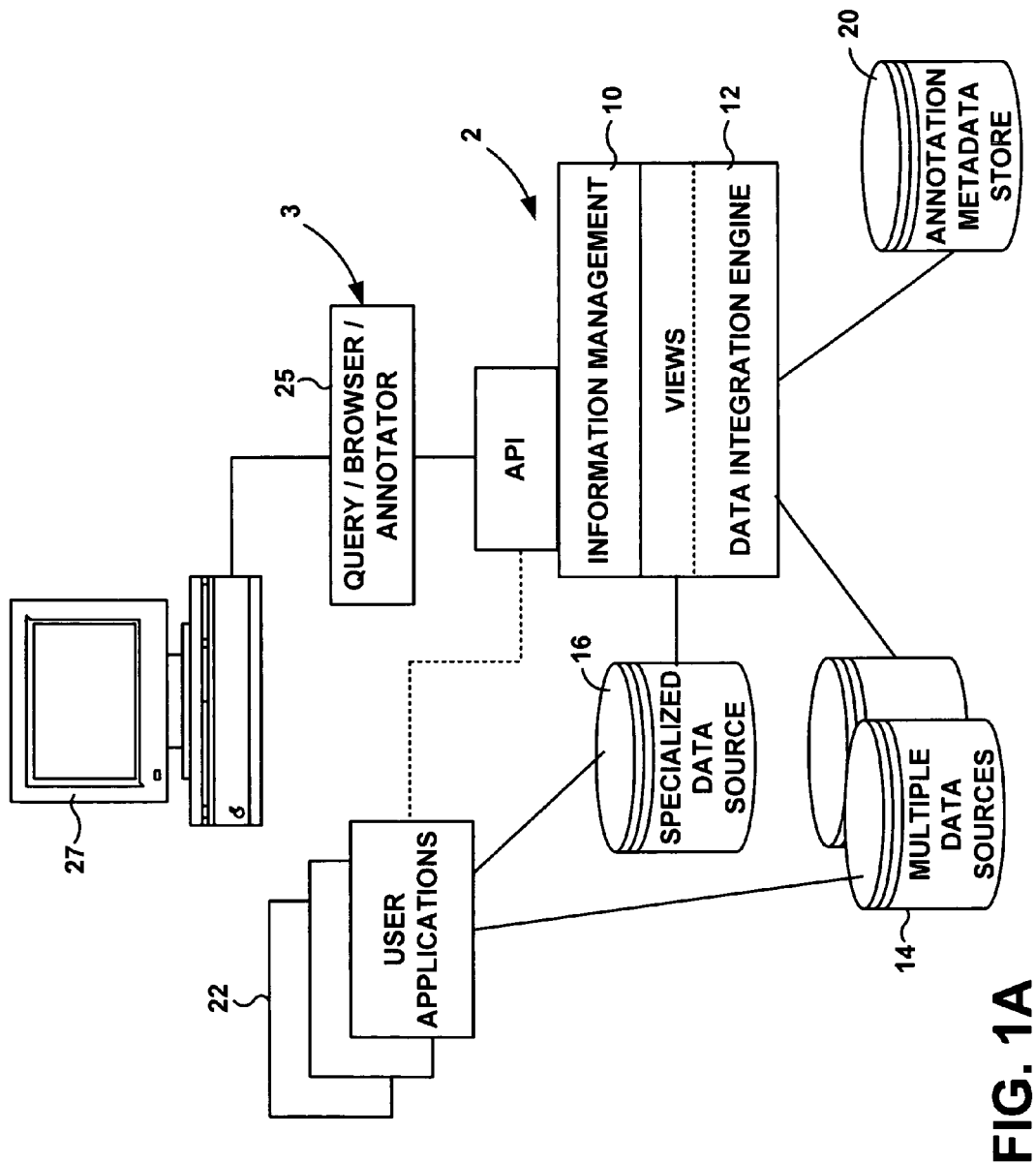
FIG. 1A is a diagram of an exemplary embodiment of the information management system of FIG. 1.

As further illustrated in FIG. 1A, computer 2 hosts an information management system 10 of the present invention, and includes, or is connected to one or multiple databases 14, 16 to be searched. Computer 2 is interconnected to computer 3 via an annotation input link 5 for allowing annotations to be inputted from computer 3 to computer 2. The annotation input can be from a user of, for example, a graphical user interface (GUI) application, or from a software application, running for example on computer 3. One or more input devices 7 can be used to provide information to computer 3. These input devices may include, but are not limited to, keyboard devices, pointing devices, monitors, scanners, modems, inputs from other systems, microphones and voice recognition applications, and like devices.

Computer 2 is interconnected to computer 4 via an annotation output link 8 for allowing annotations to be outputted from computer 2 to computer 4. The annotations and/or other data can be retrieved on the request of a user of, for example, a GUI application, or on the request of a software application running for example on computer 4. The annotations and/or other data that are retrieved from the system 1 may be utilized of displayed by means of one or more of output devices 9. These output devices 9 may include, but are not limited to, monitors, printers, modems, outputs to other systems, speakers and audio synthesizers, robots, storage systems, and like devices.

FIG. 1A portrays the overall environment in which the information management system 10 can be used according to the present invention. The information management system 10 uses a data integration engine 12 that permits users and/or applications to pose queries against data that may reside in multiple data sources, such as databases 14 and 16. As used herein, an integration engine can be any application system that can accept a query against one or multiple data sources in any form and that returns the requested data from one or multiple data source in any desired form. An exemplary data integration engine 12 is available from International Business Machines under the trademark DataJoiner®. Using the data integration engine 12, annotations can be made on data from a broad variety of existing sources, regardless of their locations. It further enables the independent storage of annotations, such as in an annotation database 20, without impacting the users' applications 22, or databases 14, 16. In the case where the user/application only wishes to annotate data in a single datasource, it is possible to writes the annotations in the same datasource, and a data integration engine is not needed.

A query/browser/annotator 25 is a separate application that provides users (represented by computer 27) with a graphical user interface (GUI) to facilitate the interaction with the information management system 10. Using the query/browser/annotator 25, the users can find, view, and annotate data.

Figure 2:
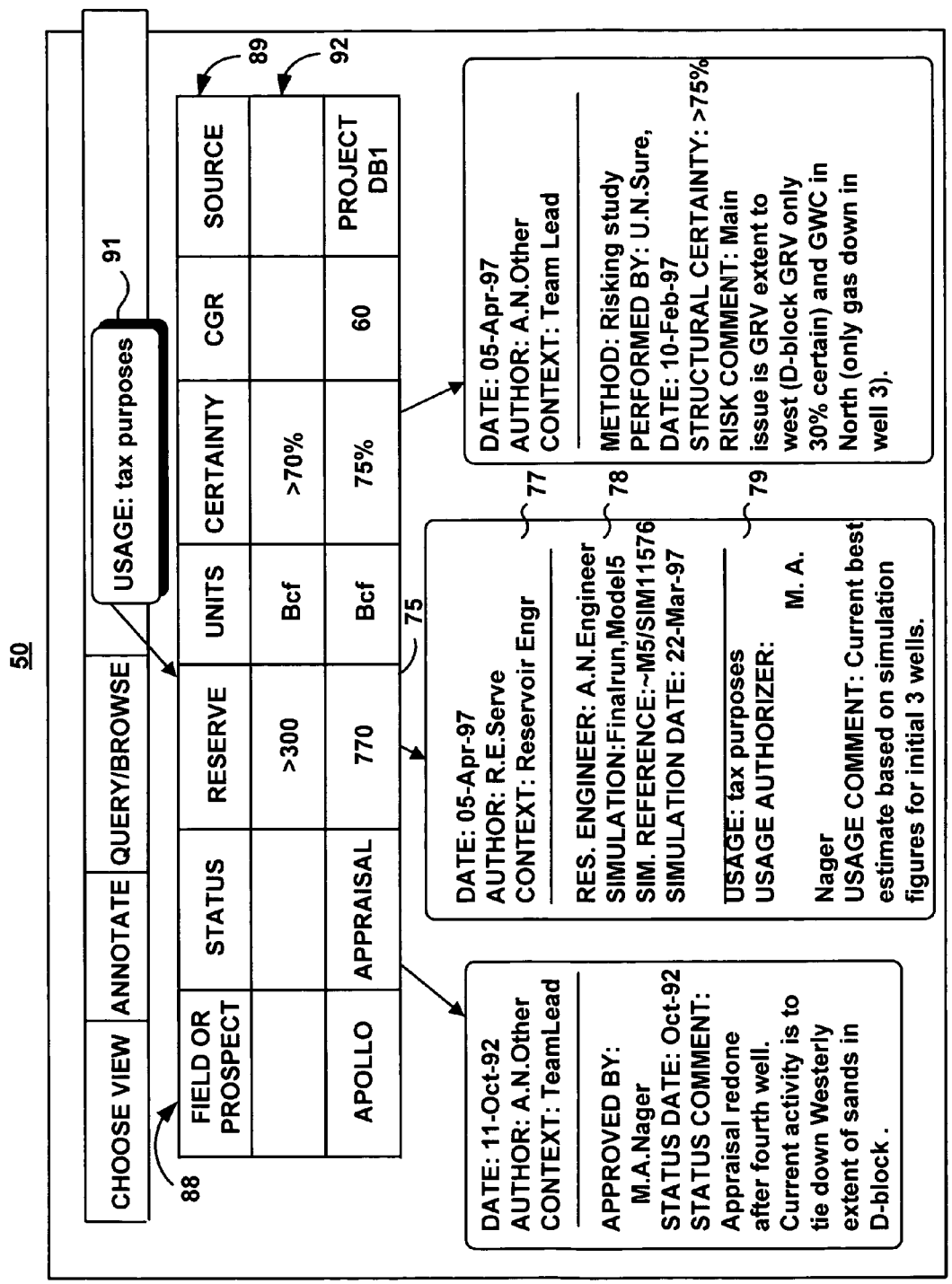
FIG. 2 is a schematic of an exemplary computer screen that can be generated using the information management system of FIG. 1.

FIG. 2 is a schematic of an exemplary computer screen 50 that can be generated using the information management system 10 of FIG. 1. The screen 50 provides an example of how a user 27 can query data in the business area of oil exploration and production. The screen 50 shows a data collection that describes the company's oil fields. The names of the oil fields are displayed in the first column 88. The different attributes of the view are shown in the first row 89. A complex query can be posed by placing predicates in the second row 92 and in block 91. The query illustrated in FIG. 2 asks for rows that have a Reserve value that is greater than 300, Units in Bcf, and a Certainty factor that is greater than 70%, as well as a Usage appropriate for Tax Purposes. Usage is actually an annotation category on cells in the Reserve data column. As a result, this exemplary query combines attributes of the data along with the annotation content to qualify the results.

The result of this query is shown in the third row. Various annotations on the retrieved values or data of this row are shown attached to the bar. It should be understood that one value or data may have multiple annotations, of multiple types, and that different values may have different sorts of annotations. The formats of the annotations depend on the discipline or context of the persons or applications writing, reading, or entering the annotations. For example, a reservoir engineer might add an annotation about a reserve simulation, but an accountant would add annotations about the financial analysis.

Figure 4:
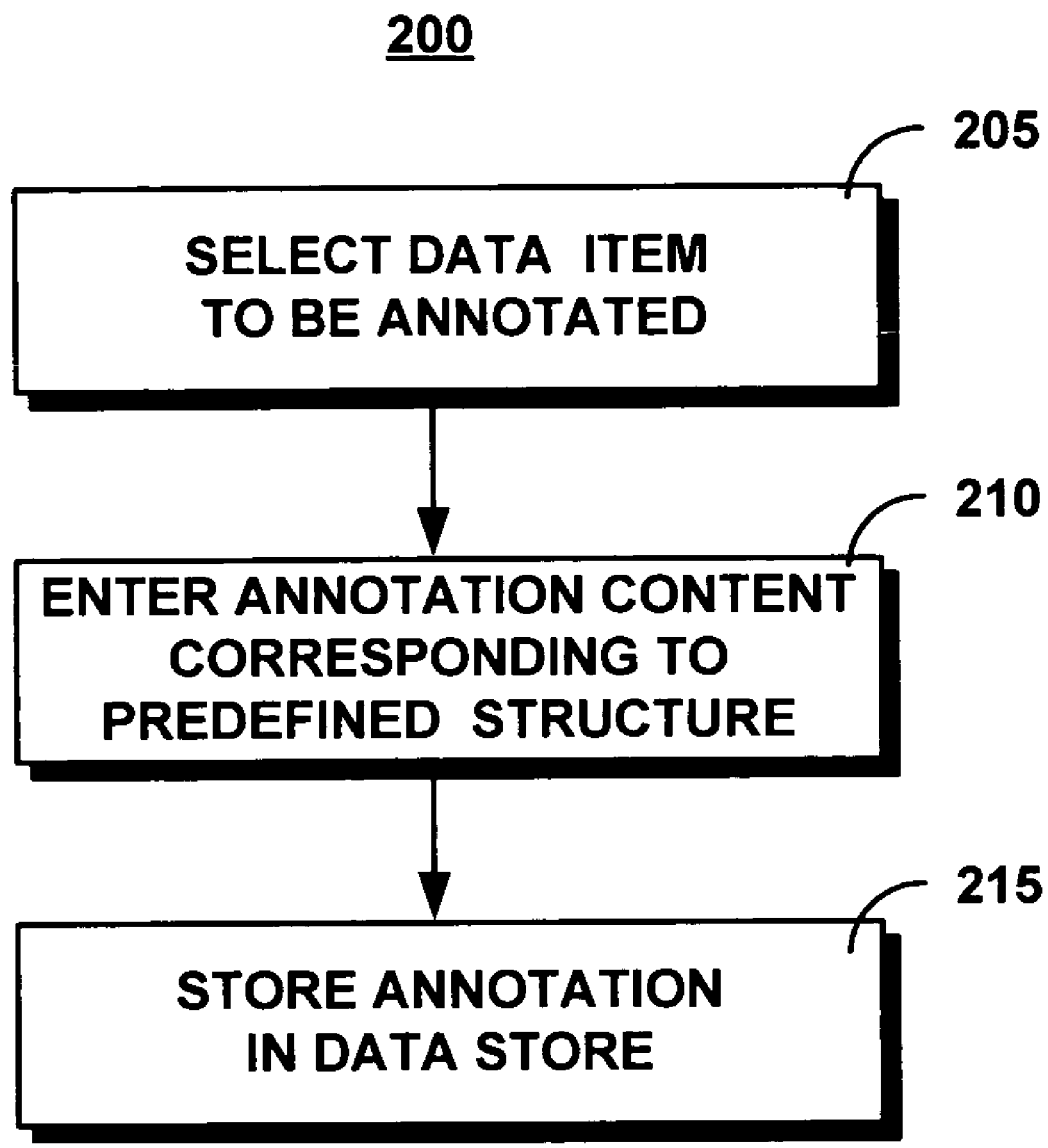
FIG. 4 is a flow chart that illustrates a process of writing an annotation using the information management system of FIG. 1.

In operation, one or more users, such as an administrator 27, or the client application 22, start the information management method of the present invention by setting up an annotation structure, as illustrated in FIGS. 3A-3D The information management system 10 is capable of performing any one or more of the following tasks or processes, with the understanding that it can perform other tasks as well:

Entering annotations about the data or fields by various input means, as illustrated in FIG. 4. These annotations are preferably stored in a separate database 20. It should however be understood that the annotations can be stored in the same data sources (i.e., 14, 16) as the data.

Figure 5:
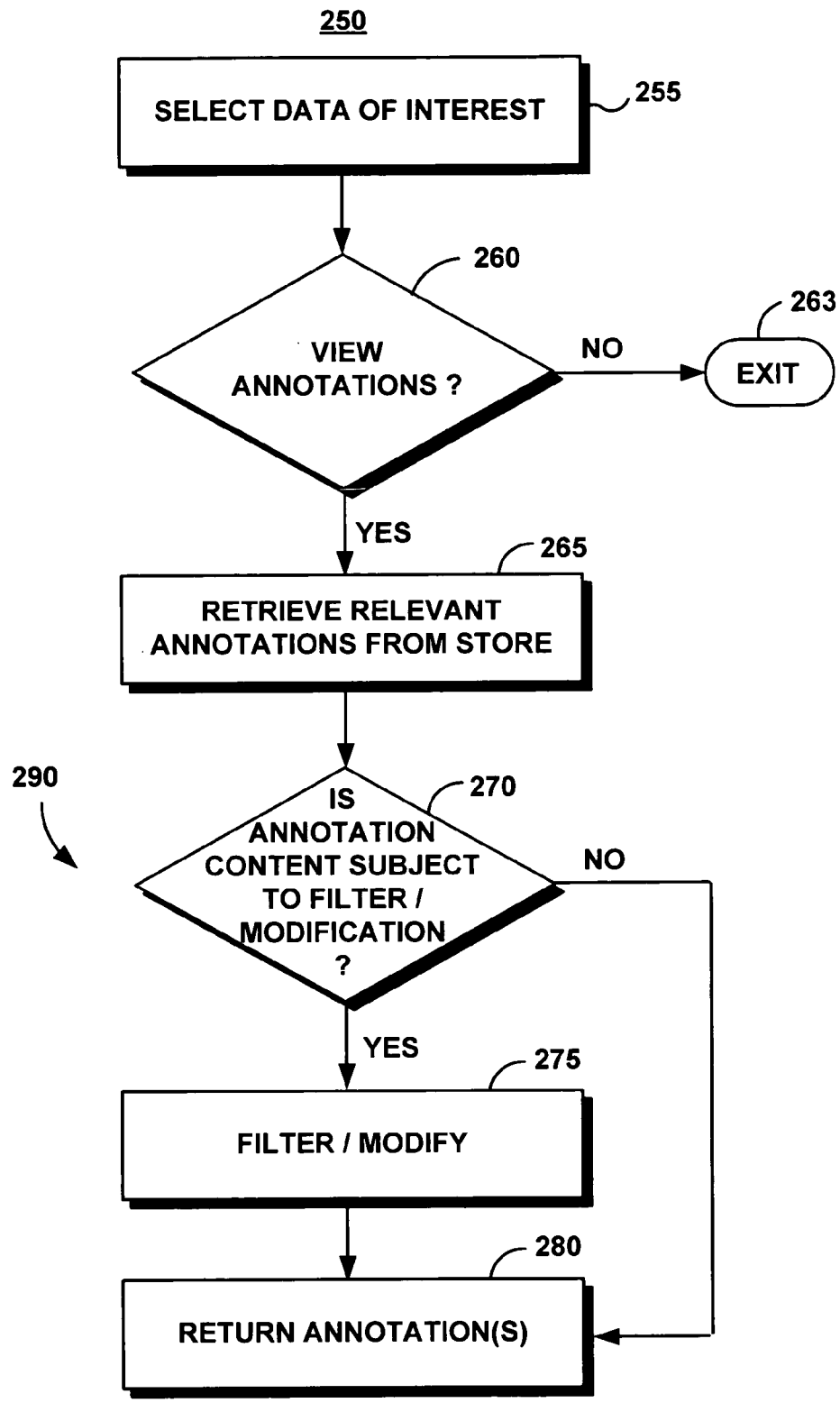
FIG. 5 is a flow chart that illustrates a process of browsing an annotation in the context of data, using the information management system of FIG. 1.

Browsing annotations in the context of data, as illustrated in FIG. 5.

Simultaneously query for both annotations and data.

Figure 6:
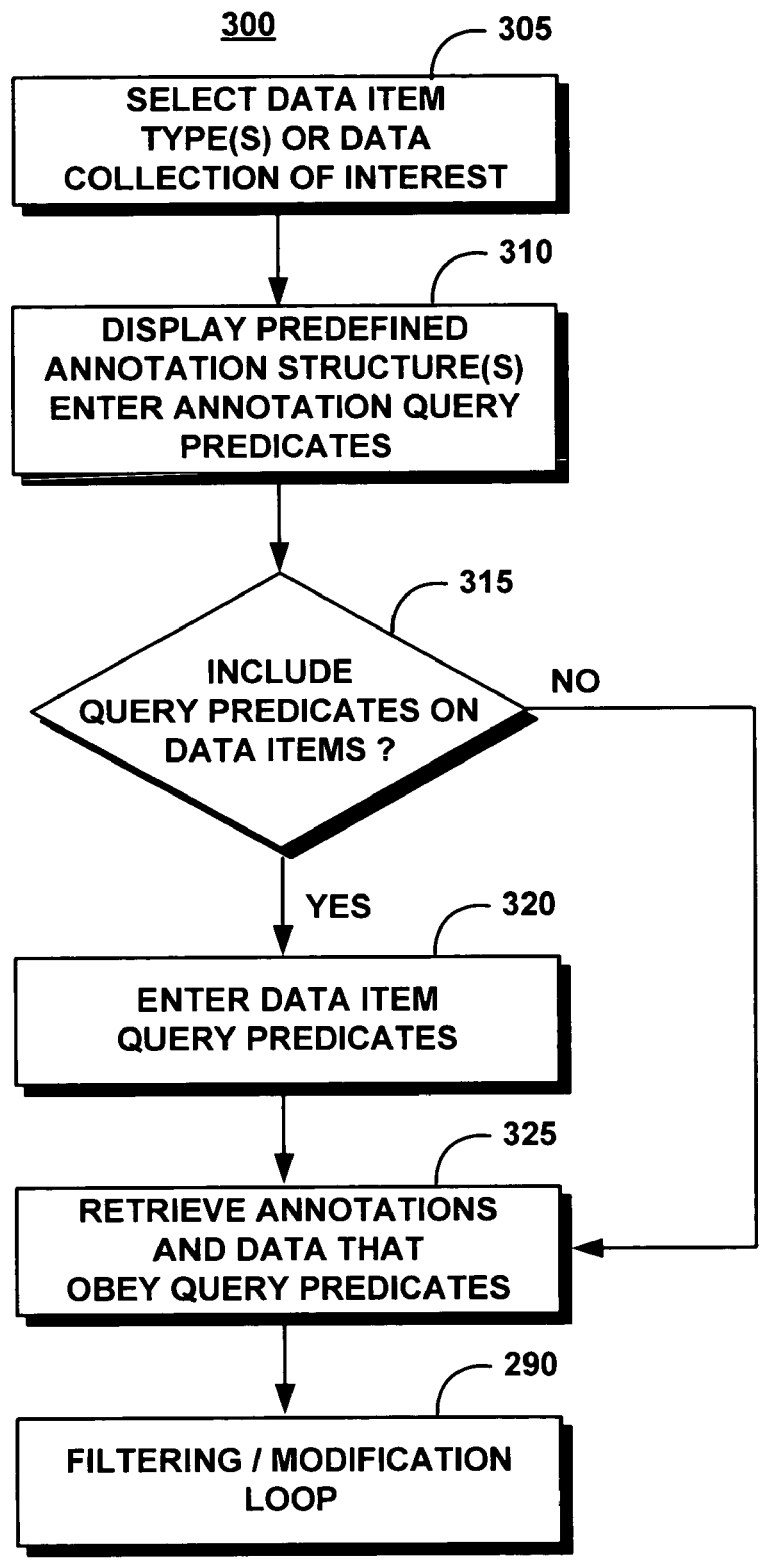
FIG. 6 is a flow chart that illustrates a process of querying for particular annotations in the context of data, using the information management system of FIG. 1.

Querying for particular annotations in the context of data, as illustrated in FIG. 6.

Figure 7:
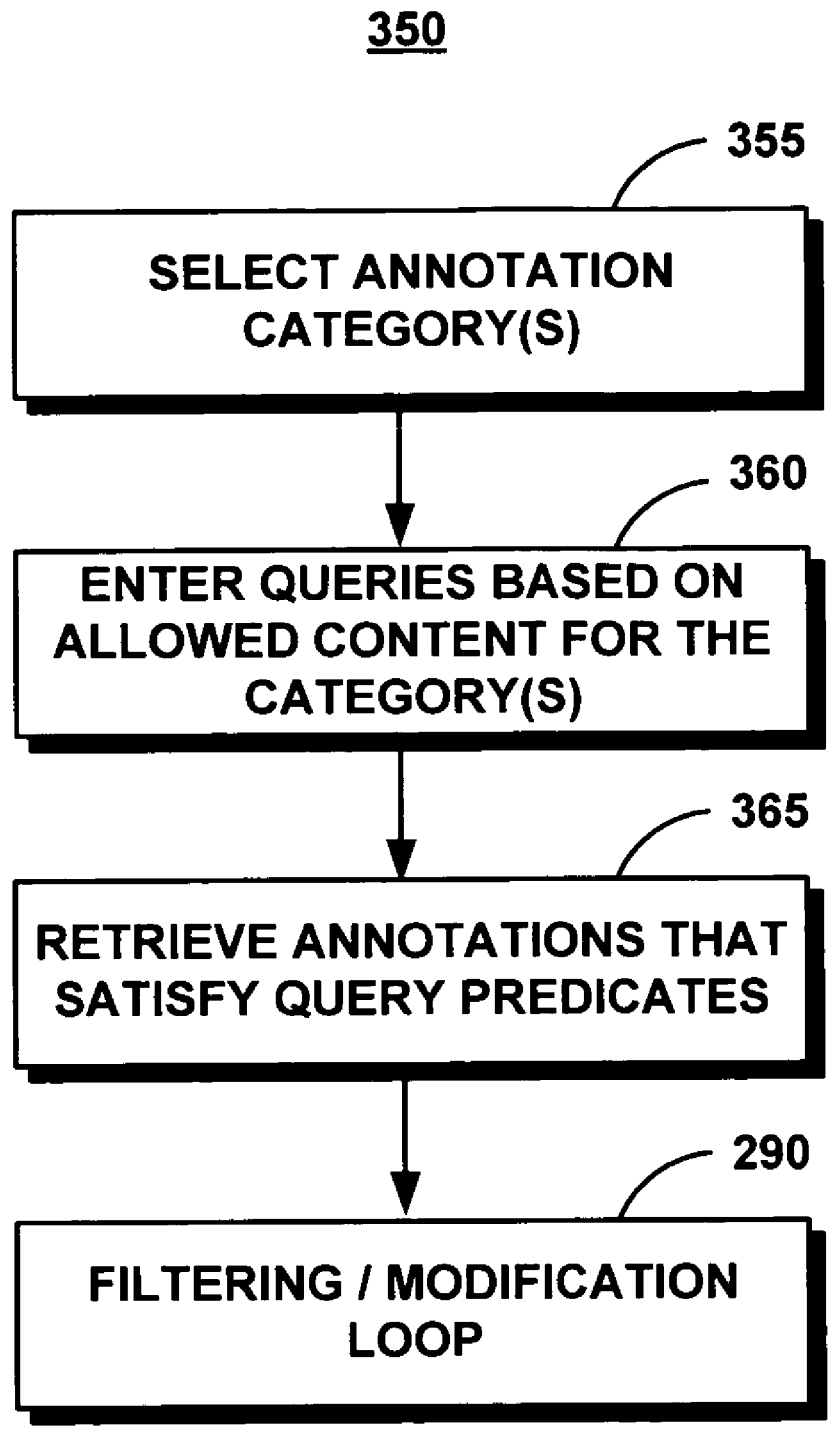
FIG. 7 is a flow chart that illustrates a process of querying across the full body of annotations, using the information management system of FIG. 1.

Querying across the full body of annotations, as illustrated in FIG. 7.

Figure 8:
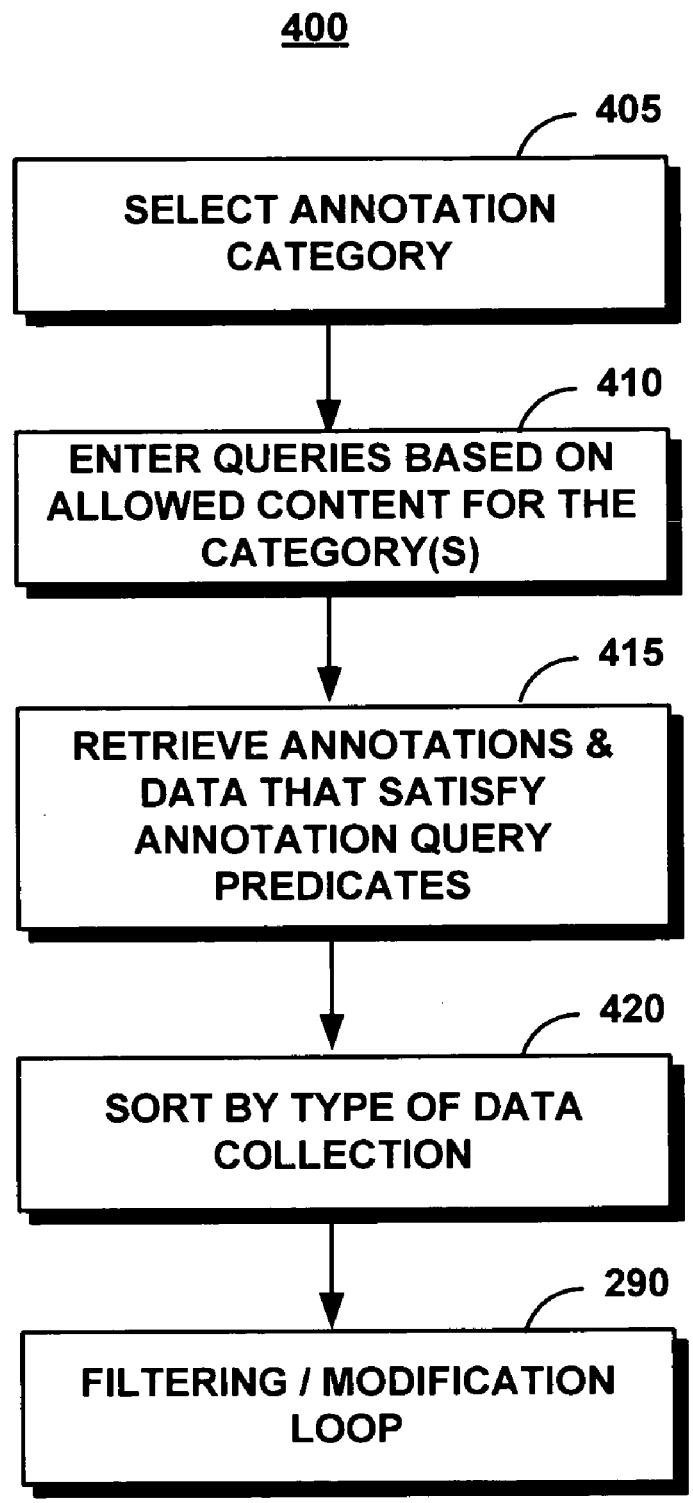
FIG. 8 is a flow chart that illustrates a process of querying for particular data in the context of the annotations, using the information management system of FIG. 1.

Querying for particular data in the context of the annotations, as illustrated in FIG. 8.

The foregoing tasks will now be described in greater detail with reference to their respective drawings. Starting with the process of setting up or organizing the annotation structure 100 (FIG. 3A), an administrator 27, for example, identifies data items or data item types to be annotated, as shown in block or step 105. An annotatable data item can be a table, a view, a row, a cell, a column or any entity referenced by an index (e.g., by an object identifier), or any attribute or subcomponent of such an entity, or any arbitrary set of such items. Specification of an annotatable data item allows any of a whole set of similar annotatable data items to have the same annotation structure. For example, "any object in class y", "any row in table x", "any cell in column a of table b". This greatly facilitates the annotation structure setup and registers the availability of annotation structures for data that has not yet been input, such as the addition of rows to a table or objects to a class. The data items and data item types can originate from a single source or from multiple sources 14, 16. In the example of FIG. 2, one of the data item types to be annotated is any cell which is listed in the column whose attribute is "Reserve".

The annotatable data item to be annotated can be selected by selecting an attribute or attributes of an entity, where the entity can be referenced, for example, by an index, a schema object or objects, or any arbitrary set of such attributes and/or schema objects. As used herein, a schema object can be, for example, a table, a class, an attribute of a class, a view, a column, a function, or any combination thereof.

The administrator 27 then selects or enters a context, if one does not already exist, for the annotation author as illustrated in block 110. The term "context" denotes a discipline, or a role being performed by a person of a particular discipline. In the above example, it is possible to allow persons of different disciplines to annotate various data items. For illustration purposes, it is possible to allow reservoir engineers, geologists and/or chemists to enter different types of information in their annotations.

Since multiple types of information can be captured in an annotation about each data item, the administrator 27 can enter a category of information to be captured about the data item, as illustrated in block 115. These categories can be factual or interpretive in nature. Examples include, but are not limited to the origin of the data (factual), the quality of the data (interpretive), and appropriate use of the data (factual and/or interpretive). The administrator 27 enters a desired category (block 115).

The method 100 then automatically determines if the selected category already exists (block 120). If the selected category does not exist, the administrator 27 enters the list of attributes for this category and how the annotation content will be defined for these attributes (block 125). As an example, for the category origin of data, three attributes might be: vendor name, install date, and the name of the person who performed the installation.

Annotation content can be associated with these attributes, during subsequent annotation entry, by any of several mechanisms, including but not limited to the following mechanisms:

A list of values (pick-list) from which an annotation author can select.

Qualifying datatypes for the values, e.g. text, numeric, document, URL, and so forth.

The method 100 then automatically inquires the administrator 27 at block 130 if another category is required for the selected data item. If the administrator 27 determines that another category is needed, the method 100 repeats the set of steps or blocks 115, 120, 125, and 130, until the administrator 27 determines at block 130 that no additional categories are needed for the selected data item.

If at block 120 the method 100 determines that the selected category already exists, the method 100 proceeds to block 130 and inquires if an additional category is required for the selected data item. If at block 130 the administrator 27 instructs the method 100 that no additional category is needed, the method 100 proceeds to block 135 (FIG. 3B), for allowing the administrator 27 to define the annotation structure from the selected categories, to assemble the categories, and to associate the annotation structure with the annotatable data items.

In the example of FIG. 2, the administrator 27 defines the annotation structure by identifying the desired categories and the order in which the annotation content will be entered and/or displayed. For illustration purposes, the annotation structure for cell 75 includes three categories: The first category 77 represents the annotation author's category, and provides information (in the form of annotations), for instance, about the author's name, the context or author's discipline, and the entry date. The second category 78 represents the simulation category, and provides information about the person who ran the simulation, e.g. reservoir engineer's name, the type of oil well simulation, the location of the simulation reference files, and the simulation date. The third category 79 represents the usage category, and provides information about the usage of data in cell 75 that can be used for tax purposes, the person who authorized this use of the data, and further comments about the use. While the foregoing example is explained in light of certain specific entries, it should be clear that alternative entries and/or categories can be used.

Once the annotation structure is defined at block 135, the method 100 automatically determines at block 140 whether this annotation structure already exists, since annotation structures can be reused. If the method 100 determines that the annotation structure does not exist, the administrator 27 builds a new annotation structure from the selected categories (block 145), as explained above in connection with block 135. The annotation structure can be built automatically from concatenation of the annotation categories. If the method 100 determines that the annotation structure already exists, it proceeds to block 150.

The method 100 associates the annotation structures with the annotatable data item. Annotation structures can vary according to the data item being annotated and/or to the context of the annotation author. Multiple annotations with differing or identical structures can be assigned to the same data item. It should be clear that the contexts can be defined for groups of people (or applications) or on an individual basis.

Figure 3A:
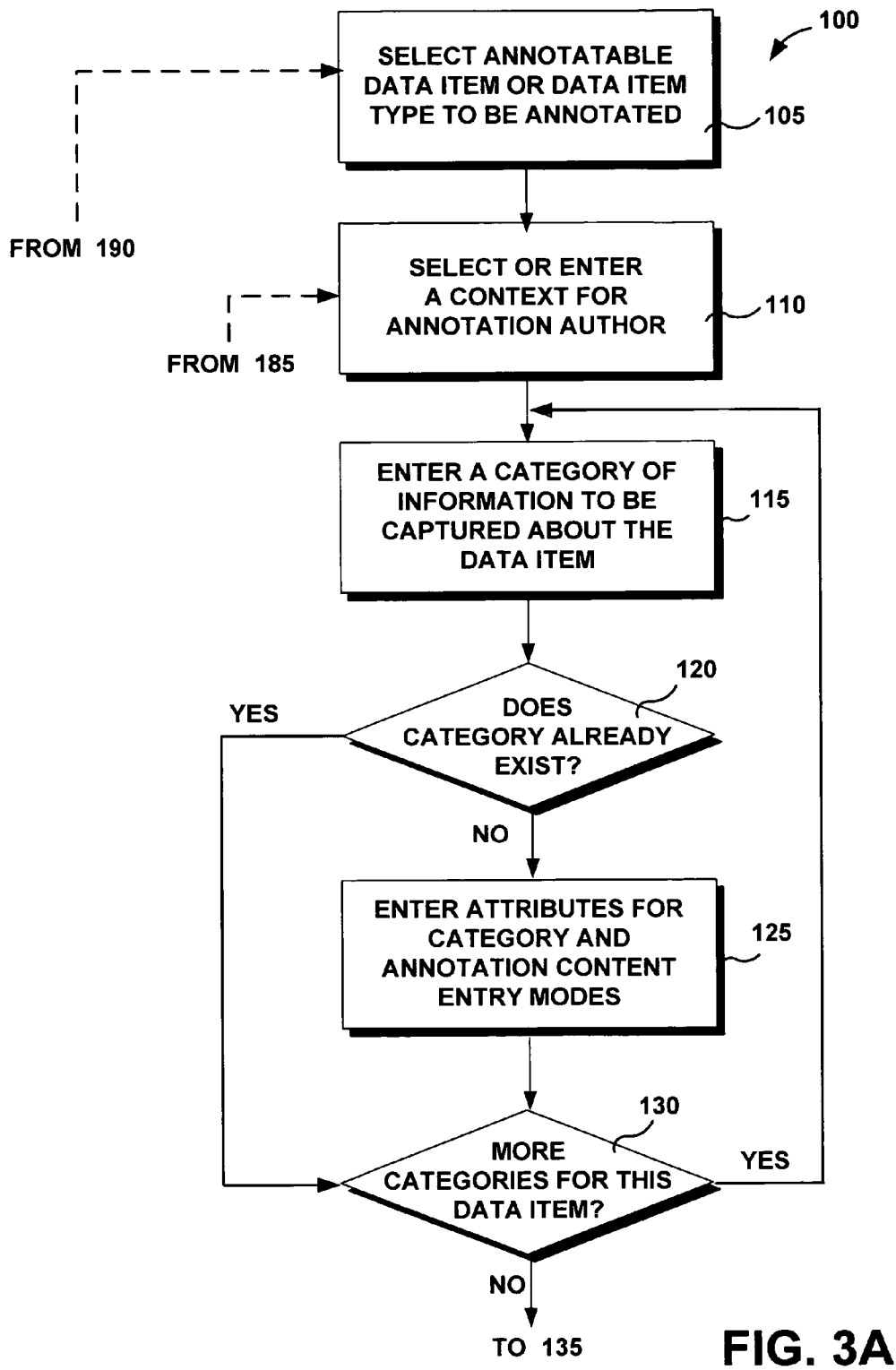
FIGS. 3A-3D represent a flow chart that illustrates a process of setting up the annotation structure using the information management system of FIG. 1.
Figure 3B:
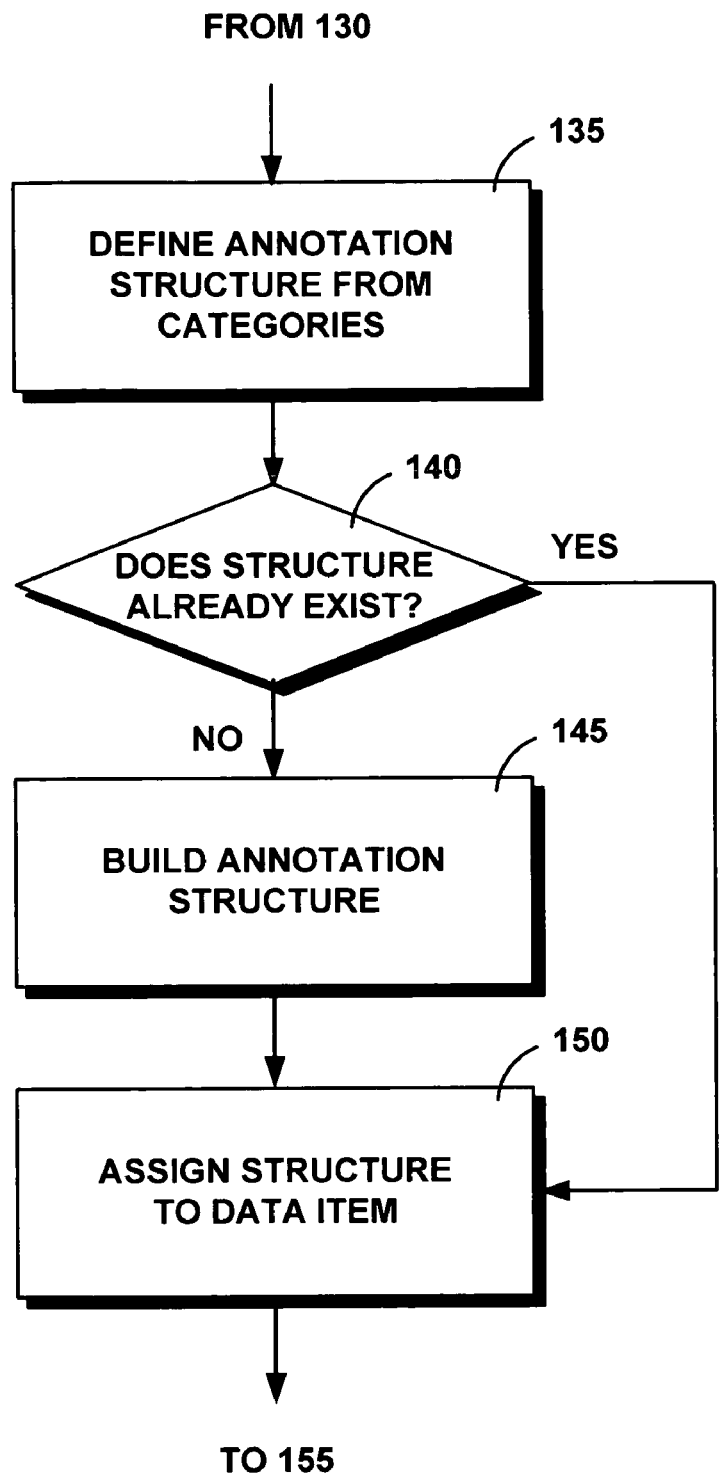
Figure 3C:
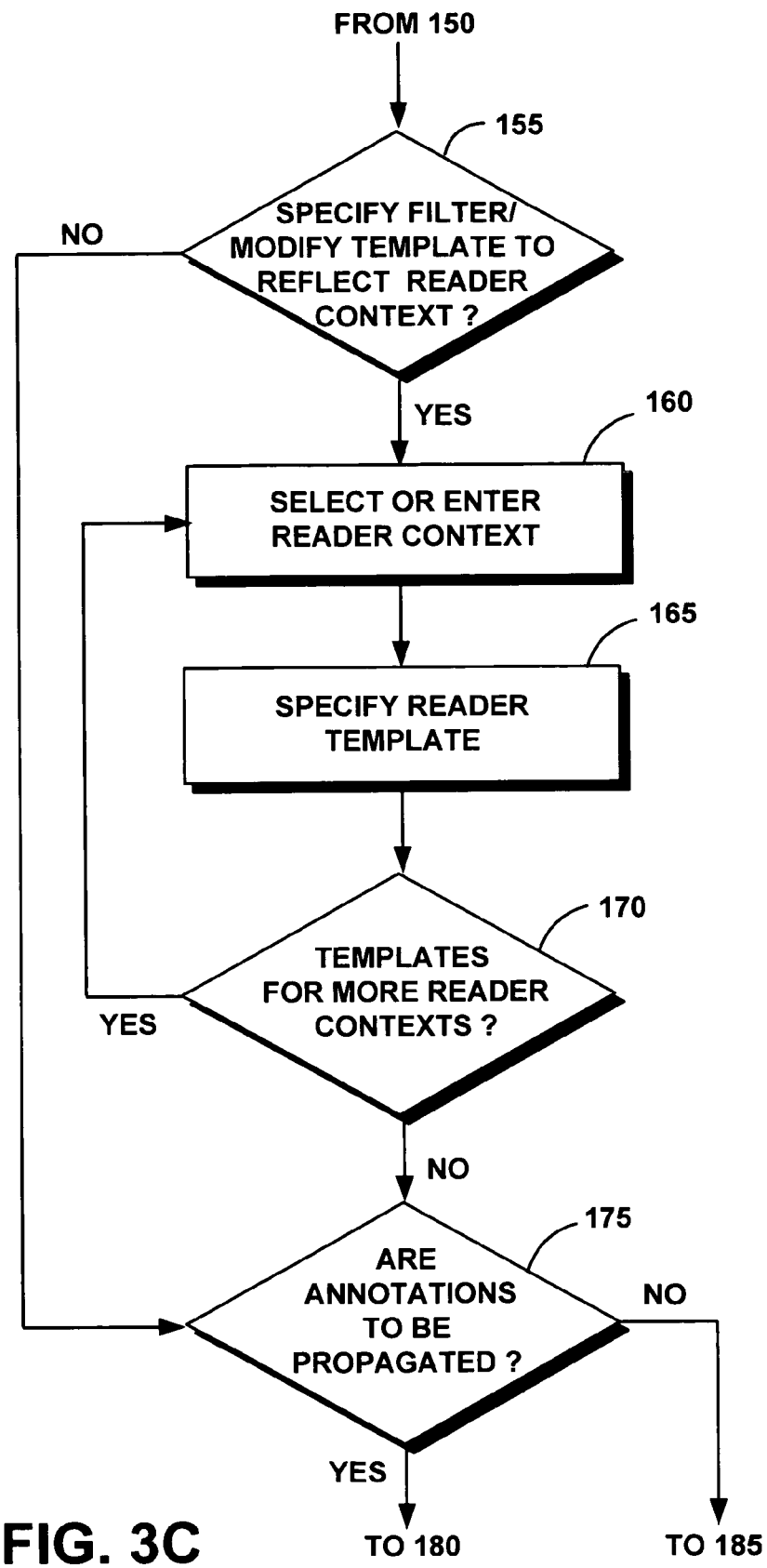
Figure 3D:
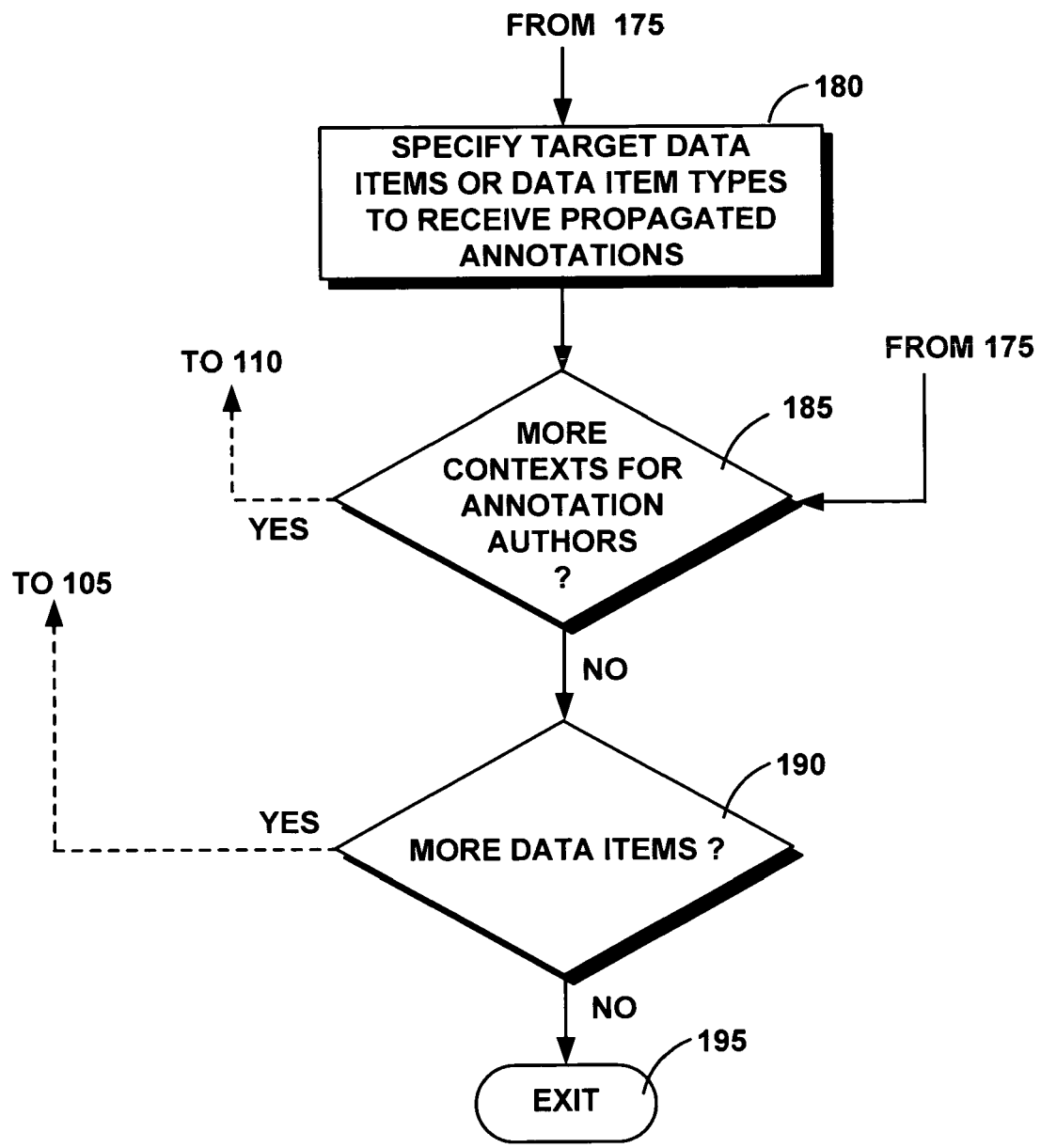

When the annotation structure assignment is completed at block 150, the method 100 can proceed to decision block 155 (FIG. 3C). Optionally, the method 100 can perform a template transforming (or filtering) loop illustrated by blocks 155, 160, 165, 170, and/or an annotation propagation loop illustrated by blocks 175, 180.

The template transforming loop can be automatically initiated by the method 100 at the decision block 155, whereby, the method 100 inquires whether the administrator 27 (or application 22) wishes to specify a filter or modify a template to reflect the reader's context. The administrator 27 indicates which categories are to be retained, which attributes within these categories are to be retained, which attribute names are to be changed and how, and more generally transformations that should be applied to the annotation content.

For illustration purposes, if the reader is a reservoir engineer, he or she might not be interested in retrieving annotations by accountants, since these may not be relevant to their work. Alternatively, a reader who is a project manager might not be interested in, or may not be allowed to see the simulation category of the annotation.

If the administrator 27 determines at decision block 155 that a filter and/or a template is needed, the administrator 27 enters a reader context, such as "Reservoir Engineer" (FIG. 2), as shown by block 160. The administrator 27 then specifies a corresponding reader template at block 165, and the method 100 inquires at decision block 170 whether templates for additional reader contexts are desired.

If the administrator 27 determines at block 170 that a template for an additional reader context is desired, the method 100 proceeds to block 160 and repeats the reader selection loop comprised of steps 160, 165, 170, until the administrator 27 determines at block 170 that no additional templates are desired.

When the reader selection loop terminates, or if the method 100 determines at step 155 that neither a filter nor a template is needed, the method 100 proceeds to decision block 175 and inquires whether or not the administrator 27 wishes to propagate the annotations about the selected data item. When the annotation structures are assigned to the data items, the method 100 enables the annotations written through these structures to be propagated to other data items. For example, a data item that describes the depth of an oil well could appear in many views pertaining to oil wells. Annotations about a depth value could be propagated to all of these views, not just the one against which the annotation was entered. In the example of FIG. 2, the data in cell 75 could appear in different views suitable for accountants, geologists, chemists, reservoir engineers and/or viewers of other disciplines. In many of these cases, the viewers might also want to see the annotations entered by the reservoir engineer in their views. If at step 175 the administrator 27 determines that no propagation is desired, the method 100 proceeds to decision block 185 and inquires whether or not additional contexts for the annotation authors are desired, as it will be explained later.

If at block 175 the method 100 determines that the annotations need to be propagated, the method 100 allows the administrator 27 to specify the target data items or data item types to receive the propagated annotations (block 180). These target data items can be selected from a drop down list and/or by entering text. The method 100 then proceeds to decision block 185 and inquires whether or not additional contexts for the annotation authors are desired. If the answer to this inquiry is in the affirmative, the method 100 loops back to block 110, and performs the loop comprised of the steps between blocks 110 and 185, as described above, until the administrator 27 determines that no additional context for the annotation authors is needed.

When the latter condition is satisfied, the method 100 proceeds to block 190 and inquires whether or not the user 27 needs to select additional data items. If no additional data items need to be selected, the method 100 is terminated at block 195. If, on the other hand, additional data items need to be selected, the method 100 loops back to block 105, and performs the loop comprised of the steps between blocks 105 and 190, as described above, until the method 100 is terminated at step 195.

Once the information management system 10 is set up according to the method 100, the system 10 will be ready to be used by the annotation authors, readers, and applications. FIGS. 4 through 8 illustrate exemplary methods of using the information management system 10. In summary, FIG. 4 illustrates the process of writing or inputting an annotation, FIG. 5 illustrates the process of browsing an annotation in the context of data, FIG. 6 illustrates the process of querying for particular annotations in the context of data, FIG. 7 illustrates the process of querying across the full body of annotations, and FIG. 8 illustrates the process of querying for particular data in the context of the annotations.

FIG. 4 illustrates a method 200 of writing an annotation using the information management system 10 of FIG. 1. The user, such as an author 27 (and/or the application 22) starts at block 205 by selecting the data item to be annotated, and further enters the annotation content corresponding to a predefined annotation structure at block 210. The method 200 then stores the annotations in the data store 20 (FIG. 1), for subsequent retrieval using the browse or query capabilities of the information management system 10.

FIG. 5 illustrates a method 250 for reading or browsing the annotations in the context of the data. For example, if a reader 27 (and/or an application 22) wishes to review or browse annotations about members of the data collection or view of interest, the information management system 10 is capable of retrieving and displaying the requested annotations. Structured Query Language (SQL) is an example of a language that can be used to search for, and return the annotations.

The method 250 begins at block 255 by having the reader 27 select the data of interest. The method 250 then inquires at block 260 if the reader wishes to view the annotations. If not, the method 250 terminates at block 263. If the reply to this inquiry is in the affirmative, the annotations corresponding to the data items within the data collection are retrieved on request from the data storage 20. The annotation content can be returned as written or, alternatively, filtered or modified in a way that depends on the context of the reader.

The method 250 proceeds to the decision block 270 and inquires if the requested annotation content is subject to filtering, transformation or modification. If it is, the method 250 proceeds to block 275 and performs the necessary filtering, transformation and/or modification, and then returns or displays the requested annotations at block 280. If on the other hand, the method 250 determines that filtering, transformation and/or modification is not required, it returns or displays the requested annotations at block 280. The loop comprised of blocks 270, 275, and 280 will hereinafter be referred to as the transforming loop 290.

FIG. 6 illustrates a method 300 for querying annotations in the context of the data, or in other terms. The method 300 performs a "combined" query, with conditions (predicates) on both data and annotation content. A reader 27 selects a data item type or data collection of interest (block 305), and enters query predicates conforming to predefined annotation structures for annotations on the data items in the selected data collection or associated with the data item type (block 310). If the reader 27 wishes to enter query predicates on the data items themselves (decision block 315), the reader specifies the data item queries (block 320). In response, the method 300 retrieves the annotations and data conforming to the reader's query predicates (block 325). The annotation content can be returned as written or, alternatively, filtered or modified in a way that depends on the context of the reader. If the reader 27 does not wish to query predicates on the data items themselves (decision block 315), the method 300 proceeds to block 325. If needed, the method 300 performs the transforming loop 290 as discussed above in connection with FIG. 5.

FIG. 7 illustrates a method 350 for querying annotations across the full body of available annotations. The reader 27 selects the annotation category or categories of interest (block 355), and enters query predicates based on the definition of the selected category or categories (block 360). The method 350 retrieves all the annotations that obey the query predicates regardless of the annotation structure (block 365). The annotation content can be returned as written or, alternatively, filtered or modified in a way that depends on the context of the reader. If needed, the method 350 performs the transforming loop 290 as discussed above in connection with FIG. 5.

FIG. 8 illustrates a method 400 for querying for particular data in the context of the annotations, which method 400 is therefore said to be annotation-centric. The reader 27 selects the annotation category or categories of interest (block 405), and enters query predicates based on the definition of the selected category or categories (block 410). The method 400 retrieves all the annotations and the data items associated with the annotations that obey the annotation query predicates (block 415). The annotation content can be returned as written or, alternatively, filtered or modified in a way that depends on the context of the reader. Optionally, the method 400 can sort the retrieved data and annotations by the type of the data collection (block 420). If needed, the method 400 performs the transforming loop 290 as discussed above in connection with FIG. 5.

It is to be understood that the specific embodiments of the invention that have been described above are merely illustrative of one application of the principles of the present invention. Numerous modifications may be made to the information management system and associated methods described herein without departing from the spirit and scope of the present invention. For example, while the information management method is described in terms of a computer, it should be understood that this method can be implemented without the use of a computer, and as such it can cover a method of conducting business and other information management tasks.

What is claimed is:

1. A computer-implemented method for annotating and retrieving data objects, comprising:
   receiving a request, from a user, to create an annotation associated with a data object selected by the user;
   determining based on a context of the user at least one category of information to be input regarding the selected data object;
   defining an annotation structure based on the at least one category of information associated with the selected data object and the context of the user, the defined annotation structure comprising one or more annotation fields;
   creating an interface, based on the defined annotation structure, allowing the user to populate the one or more annotation fields of the defined annotation structure;
   structuring the annotation based on a context of the user, and presenting the annotation on retrieval by a reader, based on a context of the reader of the annotation and as defined by the user, the presented annotation including different annotation fields than the defined annotation structure;
   receiving a query having conditions, the conditions including annotation search conditions and data search conditions;
   simultaneously searching both an annotation database and a data objects to produce a search result, the search result containing objects that satisfy both the annotation search conditions and the data search conditions; and
   presenting the search result to the user.

2. The computer-implemented method of claim 1, wherein the user is an application.

3. The computer-implemented method of claim 1, wherein defining the annotation structure comprises selecting the annotation structure based on the selected data object and a role of the user.

4. The computer-implemented method of claim 1, wherein the interface is a graphical user interface.

5. The computer-implemented method of claim 4, wherein creating the graphical user interface comprises transforming the defined annotation structure.

6. The computer-implemented method of claim 5, wherein transforming the defined annotation structure comprises filtering one or more or the annotation fields based on a role of the user.

7. A computer-implemented method for deploying an annotation management system on a network and searching the system, the method comprising:
- installing the annotation management system on the network;
- identifying by an administrator an annotatable data item manipulated by at least one application on the network;
- defining at least one annotation structure of an annotation to be received from an annotation author comprising one or more annotation fields; assigning the at least one annotation structure to the data item;
- structuring the annotation based on a context of the annotation author;
- presenting the annotation on retrieval by a reader in a different format than as received from the annotation author based on a context of the reader of the annotation;
- receiving a query having conditions, the conditions including annotation search conditions and data search conditions;
- simultaneously searching both an annotation database and a data objects to produce a search result, the search result containing objects that satisfy both the annotation search conditions and the data search conditions; and
- presenting the search result to the user.

8. The computer-implemented method of claim 7, wherein defining the at least one annotation structure comprises:
- entering at least one category of information to be captured about the data item; and
- defining the at least one annotation structure based on the category.

9. The computer-implemented method of claim 8, further comprising defining the category by entering one or more attributes for the category.

10. The computer-implemented method of claim 7, further comprising:
- selecting a context for an annotation author; and
- wherein assigning the annotation structure to the data item further comprises associating the annotations structure with the selected role.

11. The computer-implemented method of claim 7, further comprising:
- selecting a context for the reader; and
- specifying at least one template, for use in displaying an annotation to the reader having the selected context.

* * * * *